(12) United States Patent
Yan et al.

(10) Patent No.: US 9,941,805 B2
(45) Date of Patent: Apr. 10, 2018

(54) FREQUENCY AND DUTY CYCLE STRATEGIES FOR DC/DC CONVERTERS

(71) Applicant: Delta Electronics (Shanghai) Co., Ltd., Shanghai (CN)

(72) Inventors: Chao Yan, Shanghai (CN); Li-Ping Sun, Shanghai (CN); Li-Hao Yan, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 91 days.

(21) Appl. No.: 14/709,494

(22) Filed: May 12, 2015

(65) Prior Publication Data

US 2015/0333635 A1 Nov. 19, 2015

(30) Foreign Application Priority Data

May 13, 2014 (CN) .......................... 2014 1 0200433

(51) Int. Cl.
*H02M 3/335* (2006.01)
*H02M 3/337* (2006.01)
*H02M 1/00* (2006.01)

(52) U.S. Cl.
CPC ..... *H02M 3/3376* (2013.01); *H02M 3/33507* (2013.01); *H02M 2001/0022* (2013.01); *H02M 2001/0058* (2013.01); *Y02B 70/1433* (2013.01); *Y02B 70/1491* (2013.01)

(58) Field of Classification Search
CPC ........... H02M 3/3376; H02M 3/33507; H02M 2001/0058; H02M 2001/0022; H02M 3/33569; H02M 2001/0054; H02M 2001/0032; H02M 3/3353; Y02B 70/1433; Y02B 70/1491; Y02B 70/16
USPC ... 363/15, 17, 20, 21.02, 40, 41, 59, 60, 98, 363/120, 132
See application file for complete search history.

(56) References Cited

U.S. PATENT DOCUMENTS

| 6,930,893 B2 | 8/2005 | Vinciarelli | |
|---|---|---|---|
| 2011/0050188 A1* | 3/2011 | Wang | H02M 3/156 323/282 |
| 2012/0249110 A1* | 10/2012 | Mohr | H02M 3/156 323/299 |
| 2014/0085936 A1 | 3/2014 | Jin et al. | |

FOREIGN PATENT DOCUMENTS

| CN | 1523746 A | 8/2004 |
|---|---|---|
| CN | 101841244 A | 9/2010 |
| CN | 102005923 A | 4/2011 |

(Continued)

*Primary Examiner* — Alex Torres-Rivera
(74) *Attorney, Agent, or Firm* — CKC & Partners Co., Ltd.

(57) ABSTRACT

A method for controlling a DC/DC converter includes the steps of: controlling and keeping an output voltage of the DC/DC converter to stabilize at a first value according to a first interval of an input voltage of the DC/DC converter; controlling and keeping the output voltage of the DC/DC converter to stabilize at a second value according to a second interval of the input voltage of the DC/DC converter; controlling the second value of the output voltage to be greater than the first value; and controlling a switching frequency or a duty cycle of the DC/DC converter within a first predetermined range in the first and second intervals.

19 Claims, 11 Drawing Sheets

(56) References Cited

FOREIGN PATENT DOCUMENTS

| | | | |
|---|---|---|---|
| CN | 102142809 | A | 8/2011 |
| CN | 103155390 | A | 6/2013 |
| CN | 103326580 | A | 9/2013 |
| CN | 103582258 | A | 2/2014 |
| TW | 201145799 | A | 12/2011 |

\* cited by examiner

During a first interval, an output voltage of a DC/DC converter is correspondingly controlled based on an input voltage of the DC/DC converter, so that the output voltage is kept at a first value
1100

During a second interval, the output voltage is correspondingly controlled based on the input voltage so that the output voltage is kept at a second value
1200

The first and second values of the output voltage is controlled, and the second value is assumed to be greater than the first value
1300

A switch frequency or a duty cycle of the DC/DC converter is controlled and kept within a first predetermined range, during the first interval and the second interval
1400

FREQUENCY AND DUTY CYCLE STRATEGIES FOR DC/DC CONVERTERS

RELATED APPLICATIONS

This application claims priority to China Application Serial Number 201410200433.1, filed May 13, 2014, which is herein incorporated by reference.

BACKGROUND

Field of Invention

The present invention relates to a device and a method for controlling the same. More particularly, the present invention relates to a direct current to direct current (DC/DC) converter and method for controlling the same.

Description of Related Art

With the advancement of science and technology, power supply systems used by signal processing systems are getting sophisticated. DC power supply provides heavy current with lower voltage, and exhibits higher conversion efficiency, and for these reasons, it is widely adopted by the industry. In the DC power supply system, the DC/DC converter plays a critical role.

The typical way in which the DC/DC converter is controlled involves keeping the input direct voltage within a default range, so that it could be able to keep the output voltage at a constant value by changing the switch frequency. However, if such a control method is applied in resonant-type DC/DC converters, it will result in a greater variation range of the switch frequency. Also, if such a control method is applied in pulse-width-modulation type DC/DC converters, it will result in a greater variation range of the duty cycle. In both cases, the conversion efficiency of the DC/DC converter will be degraded.

In view of the foregoing, problems and disadvantages are associated with existing products that await further improvement.

SUMMARY

The following summary presents a simplified summary of the disclosure in order to provide a basic understanding to the reader. This summary is not an extensive overview of the disclosure and it does not identify key/critical elements of the present invention or delineate the scope of the present invention.

One aspect of the present disclosure is directed to a method for controlling a DC/DC converter. This method comprises the following steps: during a first interval of the input voltage, correspondingly controlling and keeping an output voltage of the DC/DC converter to stabilize at a first value based on a first range of an input voltage of the DC/DC converter; correspondingly controlling and keeping the output voltage to stabilize at a second value based on a second range of the input voltage during a second interval of the input voltage; controlling the second value of the output voltage to be greater than the first value of the output voltage; and controlling and keeping a switching frequency or a duty cycle of the DC/DC converter within a first predetermined range in the first and second intervals.

According to one embodiment of the present disclosure, a normal range of the input voltage comprises the first interval and the second interval of the input voltage.

According to another embodiment of the present disclosure, the above-mentioned output voltage of the DC/DC converter is controlled to be a step-like variation corresponding to the normal range of the input voltage.

According to yet another embodiment of the present disclosure, the above-mentioned normal range of input voltage further comprises a minimum-value interval and a maximum-value interval, in which the minimum-value interval comprises the minimum value of the input voltage, and the maximum-value interval comprises the maximum value of the input voltage.

According to still another embodiment of the present disclosure, during the above-mentioned minimum-value interval or maximum-value interval, the variation of the switch frequency or duty cycle of the DC/DC converter is controlled to be within a second predetermined range.

According to yet another embodiment of the present disclosure, the above-mentioned second predetermined range comprises the first predetermined range; in the minimum-value interval of input voltage, the switch frequency of the DC/DC converter changes in a second predetermined range which has a minimum value lower than the minimum value of the first predetermined range; or in the maximum-value interval of input voltage, the switch frequency of the DC/DC converter changes in the second predetermined range which has a maximum value greater than the maximum value of the first predetermined range.

According to another embodiment of the present disclosure, the above-mentioned second predetermined range comprises the first predetermined range; in the minimum-value interval of the input voltage, the duty cycle of the DC/DC converter changes in the second predetermined range which has a maximum value greater than the maximum value of the first predetermined range; or in the maximum-value interval of the input voltage, the switch frequency of the DC/DC converter changes in the second predetermined range which has the minimum value lower than the minimum value of the first predetermined range.

According to yet another embodiment of the present disclosure, the difference of the first interval of the input voltage equals to the difference of the second interval of the input voltage, and the variation range of the switch frequency in the first interval equals to the variation range of the switch frequency in the second interval.

According to still another embodiment of the present disclosure, the above-mentioned step of controlling and keeping the switch frequency or the duty cycle of the DC/DC converter within the first predetermined range comprises: in the first interval and the second interval of the input voltage, controlling the switch frequency to increase as the input voltage increases, or controlling the duty cycle to decrease as the input voltage increases.

According to yet another embodiment of the present disclosure, the above-mentioned method for controlling the DC/DC converter comprises: for the current value of the input voltage, if the switch frequency reaches the maximum value of the first predetermined range, when the value of the output voltage is still greater than the first value, adjusting the output voltage to the second value to maintain the switch frequency in the first predetermined range.

According to still another embodiment of the present disclosure, the above-mentioned method for controlling the DC/DC converter comprises: for the current value of the input voltage, if the switch frequency reaches the minimum value of the first predetermined range, when the value of the output voltage is still lower than second value, adjusting the output voltage to the first value to maintain the switch frequency in the first predetermined range.

According to yet another embodiment of the present disclosure, the above-mentioned method for controlling the DC/DC converter comprises: for the current value of the input voltage, if the duty cycle reaches the minimum value of the first predetermined range, when the value of the output voltage is still greater than the first value, adjusting the output voltage to the second value to maintain the duty cycle in the first predetermined range.

According to still another embodiment of the present disclosure, the above-mentioned method for controlling the DC/DC converter comprises: for the current value of the input voltage, if duty cycle reaches the maximum value of the first predetermined range, when the value of the output voltage is still lower than the second value, adjusting the output voltage to the first value to maintain the duty cycle in the first predetermined range.

Another technical aspect of the present disclosure is directed to a DC/DC converter. Said DC/DC converter comprises a DC/DC power converting unit, an output detecting circuit and a control drive unit. The DC/DC power converting unit comprises at least one switch component. The control drive unit controls the switch to switch between on and off to conduct the conversion of DC to DC power. The control drive unit comprises a core control driver and a voltage-control signal converter. The DC/DC power converting unit is configured to receive an input voltage and output a corresponding output voltage. The output detecting circuit is configured to detect the output voltage so as to output a DC detection signal. The core control driver is configured to output the control driving signal to the switch component. The voltage-control signal converter is configured to receive the DC detection signal and a default output voltage signal so as to output the control signal to the core control driver. The control signal currently outputted by the above-mentioned voltage-control signal converter is fed back to the voltage-control signal converter; the voltage-control signal converter is configured with a predetermined range for the control signal to change; and the voltage-control signal converter adjusts the default output voltage signal based on the current DC detection signal to make the control signal be within its predetermined range of the control signal.

According to one embodiment of the present disclosure, the above-mentioned voltage-control signal converter comprises a control-signal processor, an output voltage adjusting module and a voltage signal converter. The control-signal processor is configured with the predetermined range for the control signal and configured to receive the control signal, and compare the control signal with the predetermined range of the control signal so as to output an amount of adjustment about the default output voltage signal. The output voltage adjusting module is configured to receive the amount of adjustment about the default output voltage signal, the default output voltage signal and the DC detection signal to output a voltage control signal. The voltage signal converter is configured to receive the voltage control signal and output the control signal.

According to another embodiment of the present disclosure, the above-mentioned output voltage adjusting module comprises a default DC adjuster and a voltage adjuster. The default DC adjuster is configured to receive the default output voltage signal and the amount of adjustment about the default output voltage signal so as to output a reference output voltage signal and update the current default output voltage signal with the current reference output voltage signal. The voltage adjuster is configured to receive the reference output voltage signal and the DC detection signal so as to output the voltage control signal.

According to yet another embodiment of the present disclosure, the above-mentioned output voltage adjusting module further comprises a saturation limiter. The saturation limiter is disposed between the default DC adjuster and the voltage adjuster, and is configured to confine the reference output voltage signal within a pre-set range.

According to still another embodiment of the present disclosure, the above-mentioned control-signal processor further comprises a non-linear controller. The non-linear controller is deployed to calculate the amount of adjustment about the default output voltage signal.

According to another embodiment of the present disclosure, the above-mentioned DC/DC converter is a resonant DC/DC device, and the control signal outputted by the voltage-control signal converter is a frequency signal.

According to yet another embodiment of the present disclosure, the above-mentioned DC/DC converter is a pulse-width-modulation (PWM) DC/DC device, and the control signal outputted by the voltage-control signal converter is a duty cycle signal.

In view of the foregoing, embodiments of the present disclosure provide a DC/DC converter and a method for controlling such a DC/DC converter to avoid the loss of conversion efficiency of the DC/DC converter caused by a large variation range of the switch frequency or duty cycle.

These and other features, aspects, and advantages of the present invention, as well as the technical means and embodiments employed by the present invention, will become better understood with reference to the following description in connection with the accompanying drawings and appended claims.

BRIEF DESCRIPTION OF THE DRAWINGS

The invention can be more fully understood by reading the following detailed description of the embodiment, with reference made to the accompanying drawings as follows:

FIG. 1 is a flow diagram illustrating a method for controlling a DC/DC converter according to one embodiment of the present disclosure;

Figure 2A:
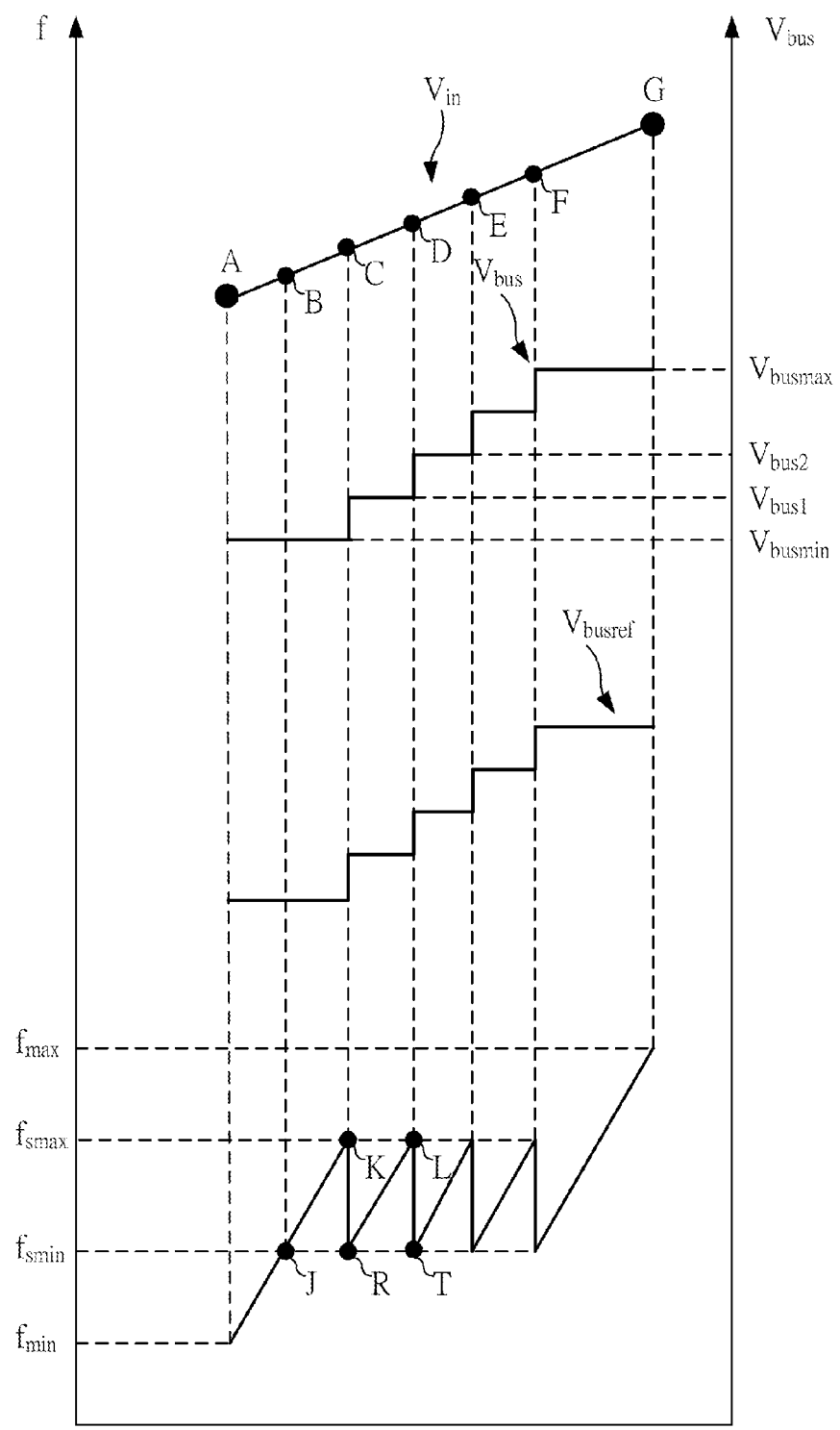
FIG. 2A is a schematic diagram illustrating an input/output voltage waveform of a DC/DC converter according to an embodiment of the present disclosure.

In accordance with common practice, the various described features/elements are not drawn to scale but instead are drawn to best illustrate specific features/elements relevant to the present invention. Also, wherever possible, like or the same reference numerals are used in the drawings and the description to refer to the same or like parts.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular forms of the same.

FIG. 1 is a schematic diagram a method 1000 for controlling a DC/DC converter (hereinafter referred to as "the control method 1000"), according to one embodiment of the present disclosure. To facilitate the understanding of the control method 1000 in FIG. 1, the following description is provided in light of the wave-form diagrams of FIGS. 2A, 2B and 2C, so as to illustrate the steps of the control method 1000.

Figure 2B:
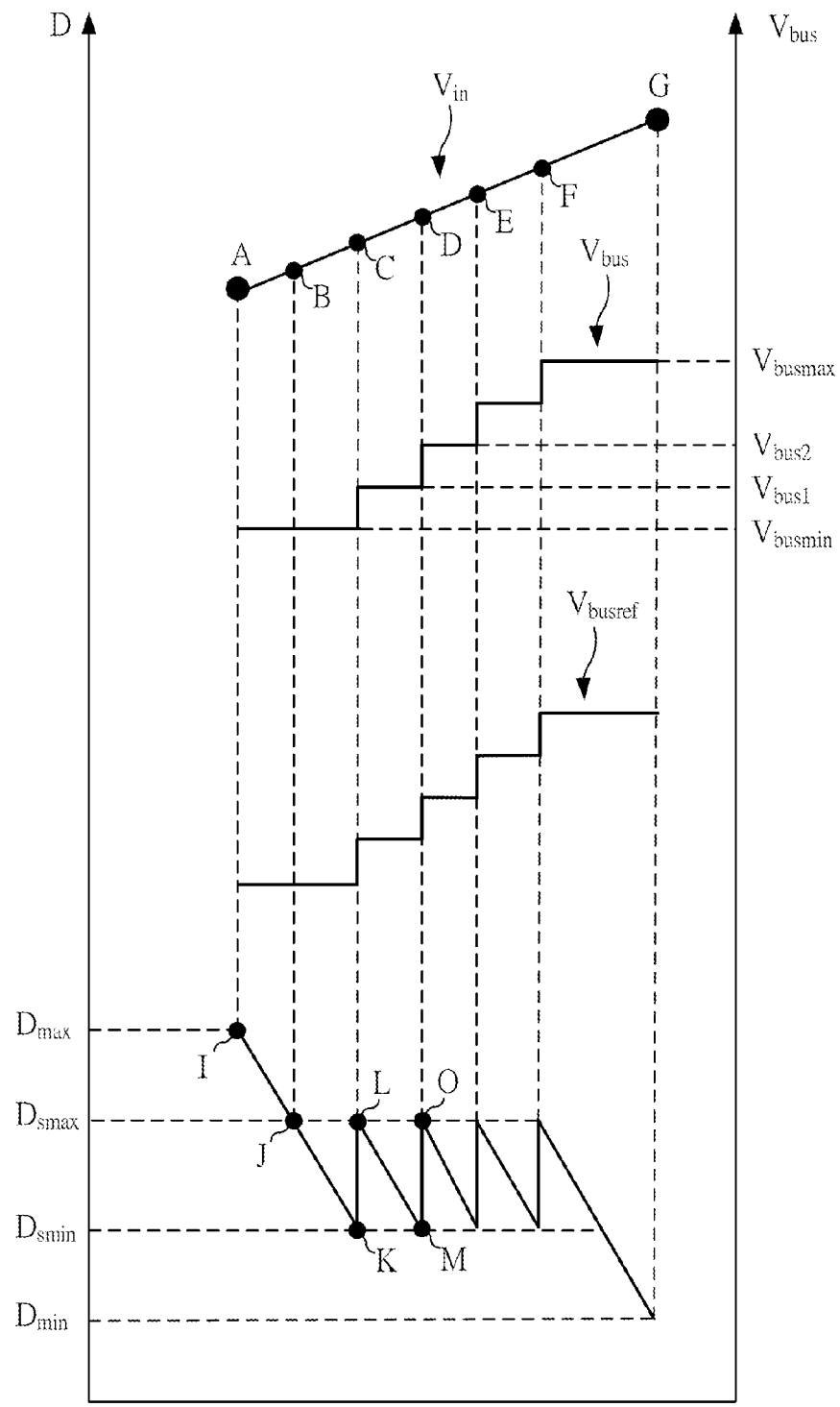
FIG. 2B is a schematic diagram of an input/output voltage waveform of a DC/DC converter according to another embodiment of the present disclosure.

First, in the upper portions of FIGS. 2A and 2B, the input voltage of the DC/DC converter is represented by $V_{in}$, the minimum value of the input voltage $V_{in}$ is represented by A, the maximum value of the input voltage $V_{in}$ is represented by G, while the remaining letters represent intermediate values of the input voltage $V_{in}$. Moreover, the output voltage of the DC/DC converter is represented by $V_{bus}$, the maximum value of the output voltage $V_{bus}$ is represented by $V_{busmax}$, the minimum value of the output voltage $V_{bus}$ is represented by $V_{busmin}$, while $V_{bus1}$ and $V_{bus2}$ are intermediate values of the output voltage $V_{bus}$. Furthermore, referring to the left-lower corner of FIG. 2A, the maximum value of the switch frequency is represented by $f_{max}$, and the relative maximum value of the switch frequency is represented by $f_{smax}$; the minimum value of the switch frequency is represented by $f_{min}$, and the relative minimum value of the switch frequency is represented by $f_{smin}$; and alphabetical letters J to T represent intermediate points of the variation of the switch frequency. Moreover, referring to the left-lower corner of FIG. 2B, the maximum value of the duty cycle is represented by $D_{max}$, the relative maximum value of the duty cycle is represented by $D_{smax}$, the minimum value of the duty cycle is represented by $D_{min}$, and the relative minimum value of the duty cycle is represented by $D_{smm}$.

Referring to FIG. 1 and FIGS. 2A and 2B, which together illustrate the process steps of the control method 1000, in Step 1100, during a first interval (e.g., the interval between points C and D of the input voltage $V_{in}$), the output voltage $V_{bus}$ of the DC/DC converter is correspondingly controlled based on the input voltage $V_{in}$, so that the output voltage $V_{bus}$ is kept at a first value $V_{bus1}$. In Step 1200, during a second interval (e.g., the interval between points D and E of the input voltage $V_{in}$), the output voltage $V_{bus}$ is correspondingly controlled based on the input voltage $V_{in}$, so that the output voltage $V_{bus}$ is kept at a second value $V_{bus2}$.

Furthermore, in Step 1300, the control method 1000 controls the first value $V_{bus1}$ and the second value $V_{bus2}$ of the output voltage $V_{bus}$, and assumes that the second value $V_{bus2}$ is greater than the first value $V_{bus1}$. In Step 1400, during the first interval and the second interval, the control method 1000 controls the switch frequency or duty cycle of the DC/DC converter within a first predetermined range. Referring to FIG. 2A, the above-mentioned first predetermined range is the range from $f_{smax}$ to $f_{smin}$. Alternatively, referring to FIG. 2B, the above-mentioned first predetermined range is the range from $D_{smax}$ to $D_{smin}$. However, the present disclosure is not limited to the embodiment illustrated in FIG. 1, which is only an illustrative example of the implementations of the present disclosure. Any modification to the above-mentioned embodiment without departing from the spirit of the present disclosure, or operation methods similar to the above-mentioned embodiment, are deemed to be within the scope of the claimed invention.

As is evident from steps 1100 to 1400, the goal of the above-mentioned control method 1000 is to control the switch frequency or duty cycle of the DC/DC converter to be within a relative small range, so that the DC/DC converter can reduce the loss of efficiency.

The above-described control method 1000 can be implemented by software, hardware and/or firmware. For example, if an implementer determines that speed and accuracy are paramount, the implementer may opt for a mainly hardware and/or firmware implementation; if flexibility is paramount, the implementer may opt for a mainly software implementation; alternatively, the collaboration of software, hardware and firmware may be adopted. It should be noted that none of the above-mentioned examples is inherently superior to the other and shall be considered limiting to the scope of the present invention; rather, these examples can be utilized depending upon the context in which the unit/component will be deployed and the specific concerns of the implementer.

Further, as may be appreciated by persons having ordinary skill in the art, the steps of the control method 1000 are named according to the function they perform, and such naming is provided to facilitate the understanding of the present disclosure but not to limit the steps. Combining the steps into a single step or dividing any one of the steps into multiple steps, or switching any step so as to be a part of another step falls within the scope of the embodiments of the present disclosure.

In one embodiment, such as the one illustrated in FIGS. 2A and 2B, the control method 1000 can control the output voltage $V_{bus}$ so that the output voltage $V_{bus}$ is a step-like variation corresponding to the above-mentioned value range of the input voltage $V_{in}$.

In another embodiment, the value of the input range of the input voltage $V_{in}$ is a continuously variable value range. As illustrated in FIGS. 2A and 2B, the above-mentioned value range can be the interval from point A to point G, and the input range of the input voltage $V_{in}$ ranges from point A to point G. As discussed above, the first interval can be the interval from point C to point D of the input voltage $V_{in}$ and exclude the point D, and the second interval can be interval from point D to point E of the input voltage $V_{in}$ and exclude the point E; thus, the above-mentioned value range comprises the first interval and the second interval. As to the above-mentioned value range, if point A corresponds to an input voltage $V_{in}$ with a voltage of 40 V, and point G corresponds to an input voltage $V_{in}$ with a voltage of 60 V, then the value range of the first interval ranges from 40 V to 60 V and excludes 60V. Herein the first interval and the second interval just refer to the two value ranges for input voltage during the normal operation of DC/DC converter and have no relationship with time. Of course, in some situation, maybe the value of input voltage varies from point A to point G continuously in one period. In some other situation, maybe the value of input voltage doesn't change continuously with time in one period, at one moment of the period, the value of the input voltage may fall within the first interval, but at the other moment of the period, the value of the input voltage may fall within the second interval.

In yet another embodiment, the above-mentioned value range of the input voltage further comprises a minimum-value interval and a maximum-value interval. The so-called minimum-value interval of the input voltage means a range of proximity to the minimum of the input voltage. For example, in the FIG. 2A, in this embodiment, the minimum-value interval could be taken as the interval from point A to point C excluded the point C out. Meanwhile the maximum-value interval means a range of proximity to the maximum of the input voltage. For example, in the FIG. 2A, in this embodiment, the maximum-value interval could be taken as the interval from point F to point G.

Responding to aforementioned the minimum-value interval and the maximum-value interval of input voltage, the switch frequency or duty cycle of the DC/DC converter is controlled to be within a second predetermined range accordingly. If the DC/DC converter is a kind of resonant converter, referring to FIG. 2A, the above-mentioned second predetermined range of the switching frequency can be the range from fmax to fsmin or the range from fsmax to fmin. If the DC/DC converter is a kind of PWM (Pulse width modulation) converter, referring to FIG. 2B, the above-mentioned second predetermined range of the duty cycle can be the range from Dmax to Dsmin or the range from Dsmax to Dmin.

As illustrated above, the second predetermined range defined herein comprises the first predetermined range. Referring to FIG. 2A, according to the minimum-value interval of the input voltage, the second predetermined range of the switch frequency of the DC/DC converter has a minimum value lower than the minimum value of the first predetermined range. For example, when the second predetermined range is the range from $f_{smax}$ to $f_{min}$, the minimum value $f_{min}$ of the second predetermined range is lower than the minimum value $f_{smin}$ of the first predetermined range. According to the maximum-value interval of the input voltage, the second predetermined range of the switch frequency of the DC/DC converter has a maximum value greater than the maximum value of the first predetermined range. For example, when the second predetermined range is the range from $f_{max}$ to $f_{smin}$, the maximum value $f_{max}$ of the second predetermined range is greater than the maximum value $f_{smax}$ of the first predetermined range.

For the duty cycle, the second predetermined range also comprises the first predetermined range. Referring to FIG. 2B, according to the minimum-value interval of the input voltage, the second predetermined range of the duty cycle of the DC/DC converter has a maximum value greater than the maximum value of the first predetermined range. For example, when the second predetermined range of the duty cycle of the DC/DC converter is the range from $D_{max}$ to $D_{smin}$, the maximum value $D_{max}$ of the second predetermined range is greater than the maximum value $D_{smax}$ of the first predetermined range. According to the maximum-value interval of the input voltage, the second predetermined range of the duty cycle of the DC/DC converter has a minimum value lower than the minimum value of the first predetermined range. For example, when the second predetermined range of the duty cycle of the DC/DC converter is the range from $D_{smax}$ to $D_{min}$, the minimum value $D_{min}$ of the second predetermined range is lower than the minimum value $D_{smin}$ of the first predetermined range.

As illustrated in FIG. 2A, the difference in value of the input voltage $V_{in}$ in the first interval (e.g., the difference between the value of points C and D of the input voltage $V_{in}$) is equal to the difference in value of the input voltage $V_{in}$ in the second time interval (e.g., the difference between the value of points D and E of the input voltage $V_{in}$). Accordingly, the variation range of the switch frequency corresponding to the first interval (e.g., the variation range of the switch frequency from $f_{smin}$ to $f_{smax}$) is the same as the variation range of the switch frequency corresponding to the second interval (e.g., the variation range of the switch frequency from $f_{smin}$ to $f_{smax}$).

Referring to Step 1400 and FIG. 2A, during the above-mentioned first interval or second interval, the control method 1000 is used to control the switch frequency to increase as the input voltage $V_{in}$ at a high value in the interval in order to keep the output voltage stable at current Bus voltage. On the other hand, referring to Step 1400 and FIG. 2B, during the above-mentioned first interval and second interval, the control method 1000 is used to control the duty cycle to decrease as the input voltage $V_{in}$ at a high value in the interval in order to keep the output voltage stable at current Bus voltage.

Referring to FIG. 2A, for the current input voltage value, if the switch frequency is the maximum value of the first predetermined range, when the value of the output voltage is still greater than the first value $V_{bus1}$, adjusting the output voltage $V_{bus}$ to the second value $V_{bus2}$ to maintain the switch frequency in the first predetermined range.

For the current input voltage value, if the switch frequency is the minimum value of the first predetermined range, the output voltage value is still lower than the second value $V_{bus2}$, adjusting the output voltage $V_{bus}$ to the first value $V_{bus1}$ to maintain the switch frequency in the first predetermined range.

In another embodiment, referring to FIG. 2B, for the current input voltage value, if the duty cycle is the minimum value of the first predetermined range, the output voltage value is still greater than first value $V_{bus1}$, adjusting the output voltage $V_{bus}$ to the second value $V_{bus2}$ to maintain the duty cycle in the first predetermined range.

For the current input voltage value, if the duty cycle is the maximum value of the first predetermined range, the output voltage value is still lower than the second value $V_{bus2}$, adjusting the output voltage to the first value $V_{bus1}$ to maintain the duty cycle in the first predetermined range.

To facilitate the understanding of the process of the control method 1000 according to embodiments of the present disclosure, the following examples are provided for a detailed explanation of the above-mentioned control method 1000. Referring to FIG. 2A, in the present embodiment, the resonant DC/DC converter is used. In this embodiment, it's assumed that the variation of the input voltage $V_{in}$ of such a DC/DC falls in a range (for example, falls in the range from point A to point G in the drawing). Here, the default voltage value of point A is 40 V, while the voltage value of point G is 60 V. Further, the default minimum output voltage $V_{busmin}$ is 9 V, the maximum output voltage $V_{busmax}$ is 11.941 V, and the predetermined range of the switch frequency of the DC/DC converter is defined as $f_{smin}$~$f_{smax}$, where $f_{smin}$ is the minimum value of the above-mentioned predetermined range, the frequency thereof is 95 kHz, and the voltage gain corresponding thereto is 1.02. Furthermore, $f_{smax}$ is the maximum value of the above-mentioned predetermined range, in which the frequency thereof is 105 kHz, and the voltage gain corresponding thereto is 0.98.

With respect to control, when the input voltage $V_{in}$ has a voltage of 42 V (point B), the corresponding switch frequency is 95 kHz (point J), and the voltage gain corresponding to such a switch frequency is 1.02. In this case, the output voltage $V_{bus}$ is 9 V. At one moment, if the input voltage $V_{in}$ is 43.714 V (point C), the corresponding switch frequency is 105 kHz (point K), and the voltage gain corresponding to such a switch frequency is 0.98. In this case, the output voltage $V_{bus}$ could stabilize at 9 V.

If the value of input voltage $V_{in}$ is greater than 43.714 V, the output voltage $V_{bus}$ could not stabilize at 9V any more with the switch frequency confined to the range from 95 khz to 105 khz. In this case, it should adjust the value of the output voltage to a higher level in order to keep the variation of the switch frequency in the first predetermined range. For example, adjusting the output voltage to 9.367V, then when the value of the input voltage $V_{in}$ is greater than 43.714V, the output voltage $V_{bus}$ could stabilize at 9.367V with the switch frequency confined to the range from 95 KHz to 105 kHz.

Thereafter, when the input voltage $V_{in}$ is too big to make the output voltage stabilize at 9.367 V by controlling the switch frequency at the highest point in the first predetermined range, then it should adjust the output voltage to a higher level, for example, 9.749V. On the contrary, if the input voltage $V_{in}$ is too small to make the output voltage stabilize at 9.367 V by controlling the switch frequency at the lowest point in the first predetermined range, then it should adjust the output voltage to a lower level, for example 9V. The following intervals of the input voltage $V_{in}$ are following the same principle, the repeat illustration is omitted herein.

Referring to FIG. 2B, it illustrates a result of the control method for a PWM type DC/DC converter. In this embodiment, the object of control changes from the switch frequency to duty cycle. The duty cycle has opposite effect on the output voltage of the PWM type DC/DC converter compared to the switch frequency on the output voltage of the resonant DC/DC converter. To be more specific, at the same value of the input voltage, the output voltage increases as the duty cycle increases and decreases as the duty cycle decreases; at the same value of the input voltage, the output voltage increase as the switch frequency decreases and decreases as the switch frequency increases. But fundamentally, others of the embodiments illustrated in the FIG. 2B is the similar to the one illustrated in the FIG. 2A, then no more details about this embodiment are given hereafter.

From the afore-mentioned two embodiments illustrated in the FIG. 2A and FIG. 2B, it can be seen that responding to one level of the output voltage, the range of the input voltage are determined by the variation of the switch frequency or the duty cycle, the bigger the variation of the switch frequency or duty cycle is, the wider the range of the input voltage is. Of course, the bigger the variation of the switch frequency or duty cycle is, the worse the efficiency of the DC/DC converter is. The designer could balance the efficiency of the DC/DC converter and simplicity of the control for the DC/DC converter to determine the variation of the switch frequency or duty cycle based on the normal range of the input voltage of the DC/DC power converter.

In FIG. 2A or FIG. 2B, there are two special intervals of the input voltage, one is the minimum-value interval, and the other one is the maximum-value interval. The minimum-value interval is from point A to point C and excluded out point C. As shown in the FIG. 2A or FIG. 2B, the minimum-value interval comprises minimum value of the input voltage; the maximum-value interval comprises maximum value of the input voltage. And it's obvious that the variation of the switch frequency or duty cycle responding to the maximum-value interval or the minimum-value interval is bigger than the other intervals of the input voltage. The range of the variation of the switch frequency or duty cycle responding to the maximum-value interval or the minimum-value interval called a second predetermined range of the switch frequency or duty cycle. In the minimum-value interval of the input voltage, the second predetermined range comprises the first predetermined range of the switch frequency and a minimum switch frequency out of the first predetermined range. In the maximum-value interval of the input voltage, the second predetermined range of the switch frequency comprises the first predetermined range of the switch frequency and a maximum switch frequency out of the first predetermined range. For the embodiment in the FIG. 2B, in the minimum-value interval of the input voltage, the second predetermined range comprises the first predetermined range of the duty cycle and a maximum duty cycle out of the first predetermined range; in the maximum-value interval of the input voltage, the second predetermined range comprises the first predetermined range of the duty cycle and a minimum duty cycle out of the first predetermined range.

Embodiments of the present invention are not limited to the ones illustrated herein. In one or two interval of the input voltage, the variation of the switch frequency or duty cycle could be bigger to other intervals of the input voltage. In practice, at the minimum value and maximum value of the input voltage, more tolerance to the variation of the switch frequency or duty cycle is given, which may help to make the control process much simpler for handling different situations. To simplify the control process, the differences of other intervals of the input voltage could be equal; the variation of switch frequency or duty cycle could be controlled within the same range. Then it will result in the step-like waveform of the output voltage according to a range of input voltage, which is illustrated in FIG. 2A or FIG. 2B.

Another aspect of the present invention discloses a DC/DC converter which could implement the control method in the afore-mentioned embodiment. Hereafter give some examples of the DC/DC converter for illustration.

Figure 3:
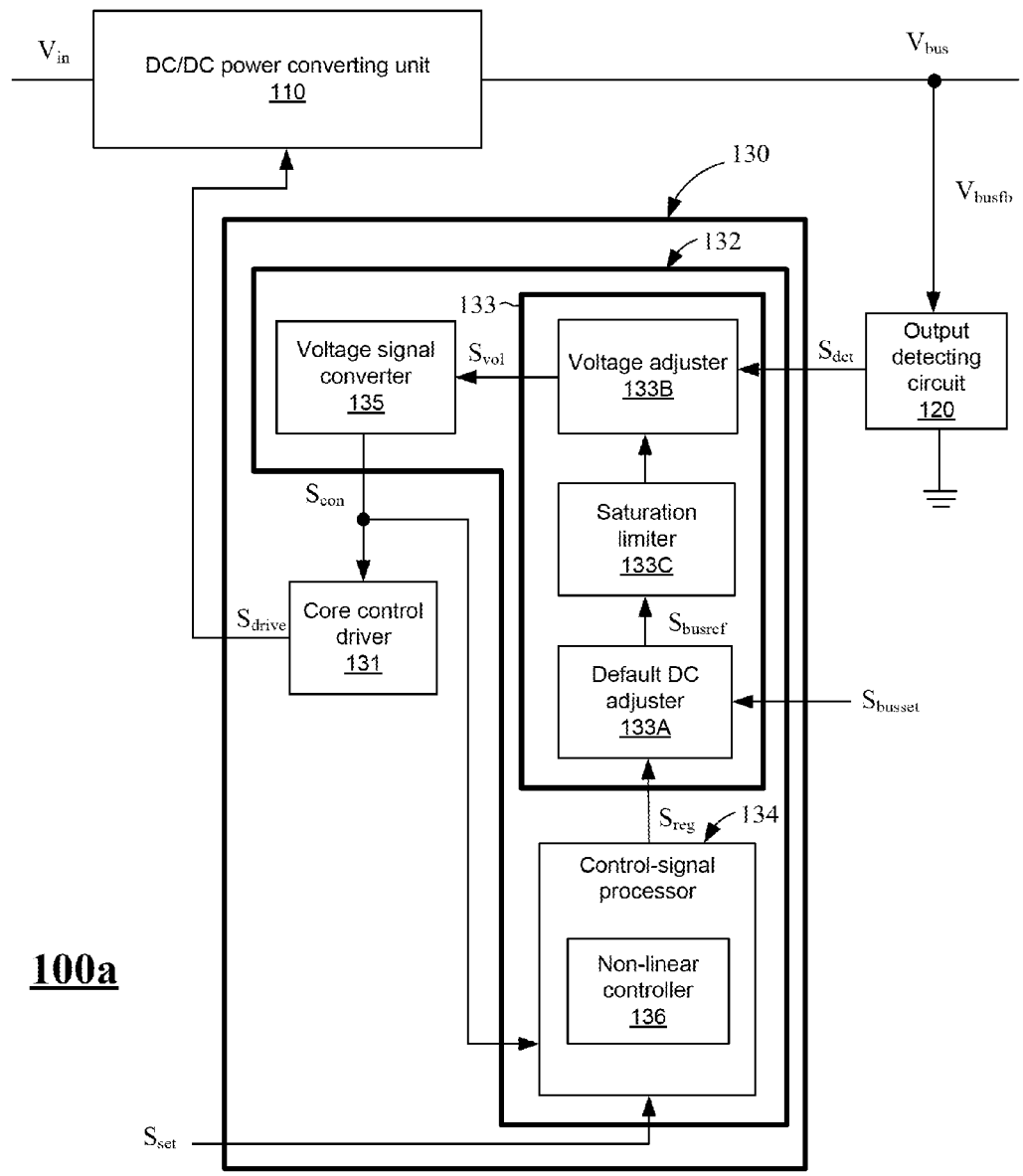
FIG. 3 is a schematic diagram of a DC/DC converter according to another embodiment of the present disclosure.

FIG. 3 is a schematic diagram of a DC/DC converter 100a. As shown in FIG. 3, the DC/DC converter 100a comprises a DC/DC power converting unit 110, an output detecting circuit 120 and a control drive unit 130. Further, the DC/DC power converting unit 110 comprises at least one switch (not shown), and the control drive unit 130 comprises a core control driver 131 and a voltage-control signal converter 132.

In operation, the above-mentioned DC/DC power converting unit 110 is configured to receive the input voltage $V_{in}$ so as to output the corresponding output voltage $V_{bus}$. The output detecting circuit 120 is configured to detect the output voltage $V_{bus}$ so as to output a direct current detection signal $S_{det}$. The core control driver 131 is configured to output a control driving signal $S_{drive}$ to the switch of the DC/DC power converting unit 110 to turn on/off the switch. The voltage-control signal converter 132 is configured to receive a DC detection signal $S_{det}$ and a default output voltage signal $S_{busset}$ so as to output a control signal $S_{con}$ to the core control driver 131.

Furthermore, the control signal $S_{con}$ currently outputted by the voltage-control signal converter 132 is fed back to the voltage-control signal converter 132. The voltage-control signal converter 132 is configured with a predetermined range of the control signal that allows the variation of the control signal $S_{con}$, and the voltage-control signal converter 132 adjusts the default output voltage signal $S_{busset}$ based on a current DC detection signal $S_{det}$ until the control signal $S_{con}$ is controlled to be within the predetermined range of the control signal. However, the present disclosure is not limited to the embodiment illustrated in FIG. 3, which is only an illustrative example of the implementations of the present disclosure, and any modification to the above-mentioned embodiment without departing from the spirit of the present disclosure, or operation methods similar to the above-mentioned embodiment, are deemed to be within the scope of the claimed invention.

In one embodiment, the voltage-control signal converter 132 comprises an output voltage adjusting module 133, a control-signal processor 134 and a voltage signal converter 135. In operation, the control-signal processor 134 stores with a predetermined range for the control signal. Furthermore, the control-signal processor 134 is configured to receive the control signal $S_{con}$, and compare the control signal $S_{con}$ with the predetermined range of the control signal so as to give a determination about whether to change current level of the output voltage and outputs an amount of adjustment about the default output voltage signal. Moreover, the output voltage adjusting module 133 is configured to receive the amount of adjustment about the default output voltage $S_{reg}$, the default output voltage signal $S_{busset}$ and the DC detection signal $S_{det}$, so as to output a voltage control signal $S_{vol}$. The voltage signal converter 135 is configured to receive the voltage control signal $S_{vol}$ and then output the control signal $S_{con}$.

In another embodiment, the output voltage adjusting module 133 is configured to comprise a default DC adjuster 133A and a voltage adjuster 133B. In operation, the default DC adjuster 133A is configured to receive the default output voltage signal $S_{busset}$ and the amount of adjustment about the default output voltage $S_{reg}$ so as to output the reference output voltage signal $S_{busref}$, and update the current default output voltage signal $S_{busset}$ with the current reference output voltage signal $S_{busref}$. The voltage adjuster 133B is configured to receive the reference output voltage signal $S_{busref}$ and the DC detection signal $S_{det}$ so as to output the voltage control signal $S_{vol}$.

In yet another embodiment, the output voltage adjusting module 133 further comprises a saturation limiter 133C. The saturation limiter 133C is disposed between the default DC adjuster 133A and the voltage adjuster 133B, and is configured to confine the reference output voltage signal $S_{busref}$ within a pre-set range.

In still another embodiment, the control-signal processor 134 further comprises a non-linear controller 136. The non-linear controller 136 is deployed to calculate the amount of adjustment about the default output voltage signal $S_{reg}$.

Figure 4:
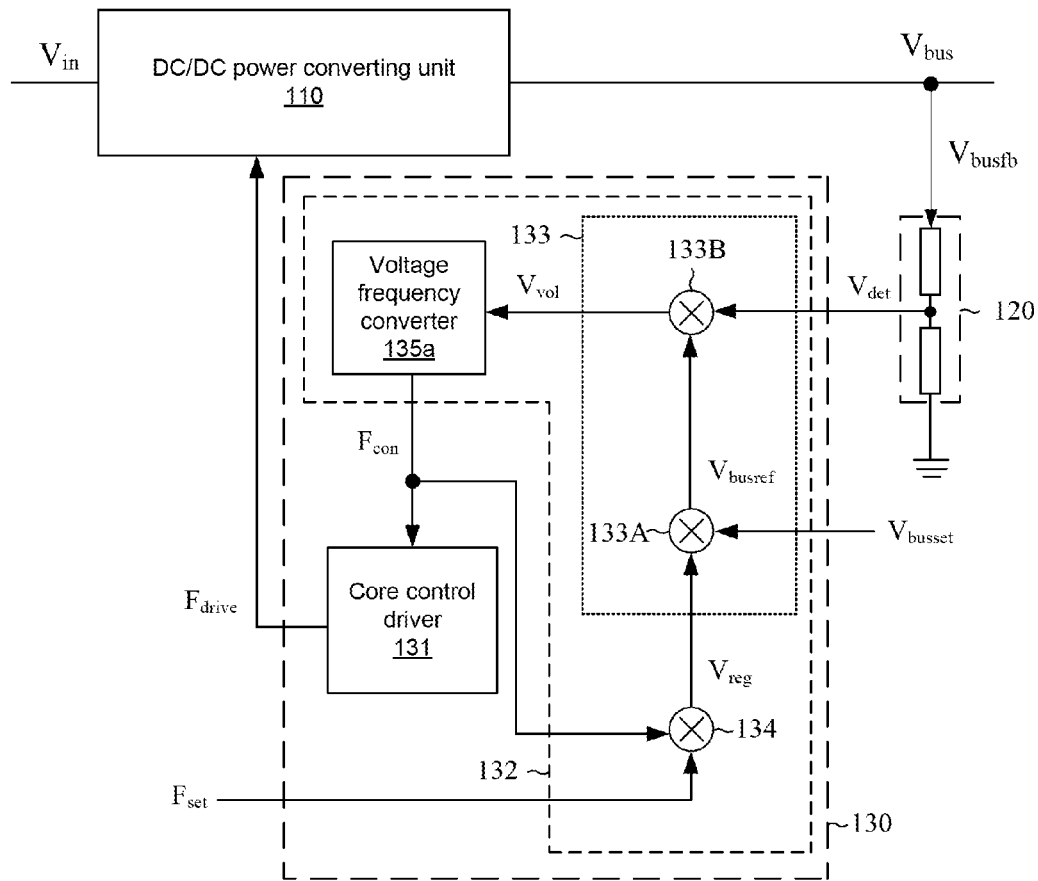
FIG. 4 is a schematic diagram of a DC/DC converter according to yet another embodiment of the present disclosure.

FIG. 4 is a schematic diagram of a DC/DC converter 100b according to yet another embodiment of the present disclosure. The DC/DC converter 100b in FIG. 4 is a variation for implementing the DC/DC converter 100a in FIG. 3. In FIG. 4, the DC/DC converter 100b is a resonant DC/DC device, and hence, the DC/DC converter 100b adopts a strategy in relation to controlling the switch frequency. In FIG. 4, the output detecting circuit 120 of FIG. 3 is implemented by a bleeder circuit; the control-signal processor 134, the default DC adjuster 133A and the voltage adjuster 133B of FIG. 3 can be implemented by software compiled in a computer; and the voltage signal converter 135 of FIG. 3 is implemented by a voltage frequency converter 135a.

In operation, the control-signal processor 134 can compare the default switch frequency $F_{set}$ with the switch frequency $F_{con}$ to decide whether to change the default output voltage. The default switch frequency $F_{setca}$ can be set in advance to be within a range, e.g., the switch frequency range $f_{smin} \sim f_{smax}$ of FIG. 2A. Subsequently, the default DC adjuster 133A is used to add the adjustment level $V_{reg}$ of the default output voltage and the default output voltage $V_{busset}$ to generate an output reference output voltage $V_{busref}$. Moreover, the output detecting circuit 120 may perform voltage division with respect to the output voltage $V_{bus}$ to generate a DC detection voltage $V_{det}$. Next, the voltage adjuster 133B subtracts the DC detection voltage $V_{det}$ from the output reference output voltage $V_{busref}$ to generate a control voltage $V_{vol}$, and then the voltage frequency converter 135a converts the control voltage $V_{vol}$ to a switch frequency $F_{con}$. Thereafter, the core control driver 131 is configured to receive and drive the DC/DC power converting unit 110 based on the switch frequency $F_{con}$. However, the present disclosure is not limited to this particular embodiment, which is only an illustrative example of the various implementations of the present disclosure for facilitating the understanding of the present disclosure.

Figure 5:
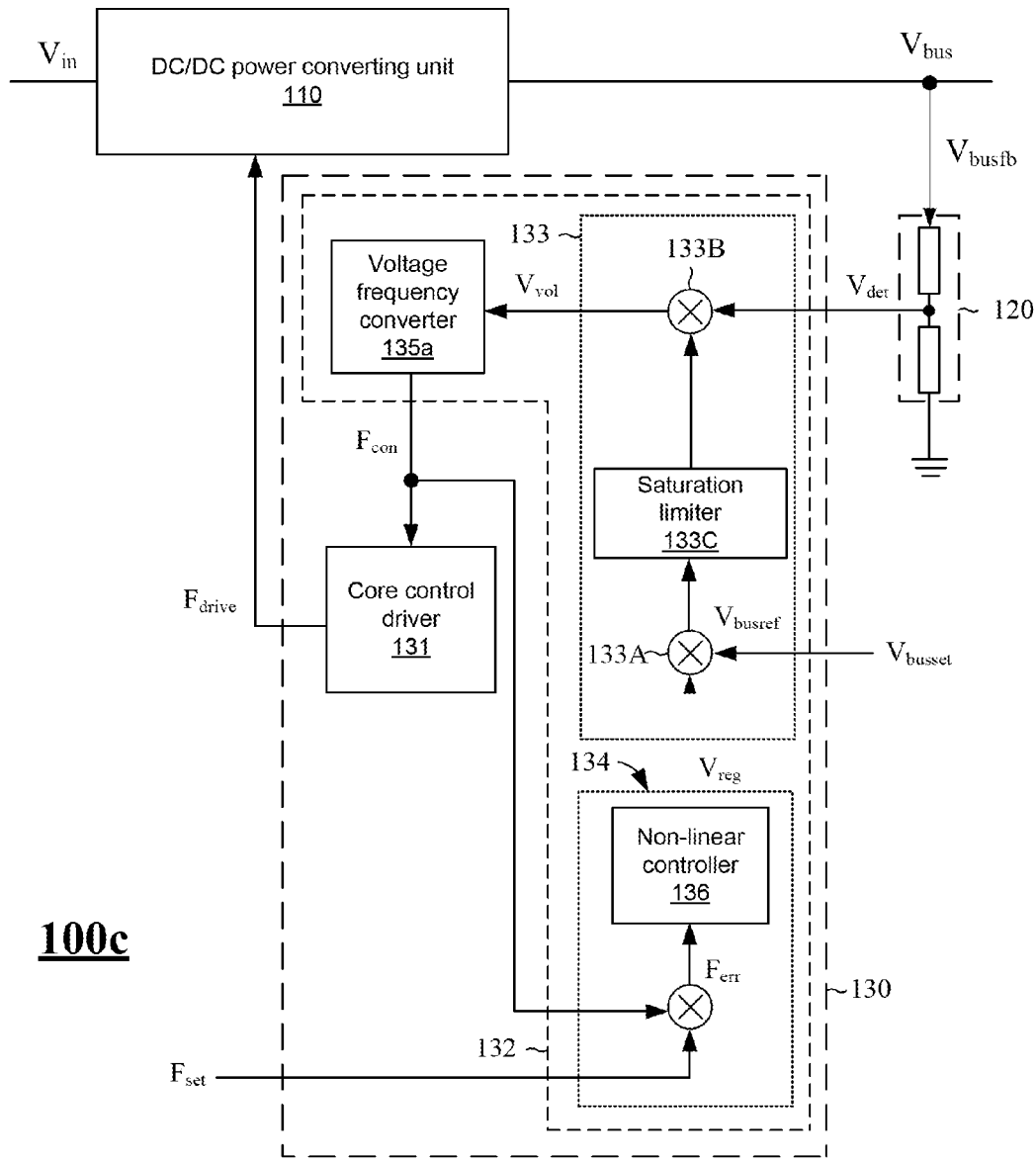
FIG. 5 is a schematic diagram of a DC/DC converter according to still another embodiment of the present disclosure.

FIG. 5 is a schematic diagram of a DC/DC converter 100c according to still another embodiment of the present disclosure. Compared with FIG. 4, the control-signal processor 134 in FIG. 5 further comprises a non-linear controller 136. In operation, firstly, the control-signal processor 134 compares the default switch frequency $F_{set}$ and the switch frequency $F_{con}$ to generate a frequency difference $F_{err}$. The above-mentioned non-linear controller 136 can process the frequency difference $F_{err}$ to generate the amount of adjustment about the default output voltage $V_{reg}$. A detailed comparison process is provided hereinbelow. The default switch frequency $F_{set}$ can be set in advance to be within a range, such as the switch frequency range $f_{smin} \sim f_{smax}$ in FIG. 2A. If a sample switch frequency $F_{con}$ falls within the switch frequency range $f_{smin} \sim f_{smax}$, the original switch frequency is maintained. If a sample switch frequency $F_{con}$ is greater than the maximum value $f_{smax}$ of the switch frequency range, the sample switch frequency $F_{con}$ is subtracted from the maximum value $f_{smax}$ of the switch frequency range so as to generate the frequency difference $F_{err}$. If the sample switch frequency $F_{con}$ is lower than the minimum value $f_{smin}$ of the switch frequency range, the sample switch frequency $F_{con}$ is subtracted from the minimum value $f_{smin}$ of the switch frequency range so as to generate the frequency difference $F_{err}$. However, the present disclosure is not limited to the above-mentioned comparison process, which is only an illustrative example of the implementations of the present disclosure for facilitating the understanding of the present disclosure.

In the present embodiment, the non-linear controller 136 can be, but is not limited to being, a proportional regulator, proportional integrator, or proportional-integral-differential regulator. Furthermore, as compared with FIG. 4, the DC/DC converter 100c in FIG. 5 further comprises a saturation limiter 133C. The saturation limiter 133C is configured to confine the reference output voltage $V_{busref}$ within a pre-set range, in which said pre-set range can be correspondingly set in advance depending on actual needs.

Figure 6:
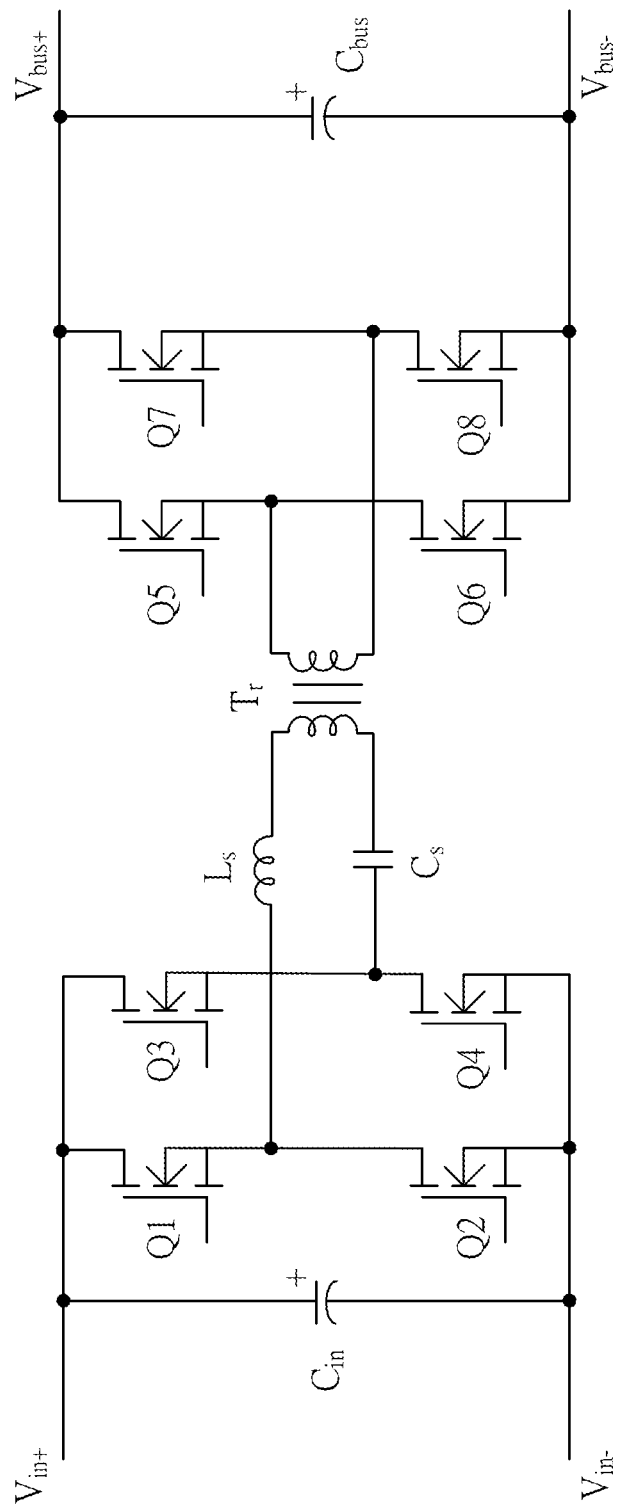
FIG. 6 is a schematic diagram of a resonant DC/DC converter according to an embodiment of the present disclosure.

FIG. 6 is a schematic diagram of a resonant DC/DC converter according to an embodiment of the present disclosure. As shown in FIG. 6, said resonant DC/DC converter is an LLC full-bridge circuit, the secondary circuit is a full-bridge synchronizing rectifier suitable for use in controlling the switch frequency, the input voltage is represented by $V_{in+}$ and $V_{in-}$, the input filter capacitor is represented by $C_{in}$, the primary switch element is represented by Q1~Q4, the resonant inductor is represented by Ls, the transformer is represented by Tr, the resonant capacitor is represented by Cs, the secondary switch element is represented by Q5~Q8, the bus output filter capacitor is represented by $C_{bus}$, and the bus voltage is represented by $V_{bus+}$ and $V_{bus-}$. However, the present disclosure is not limited to the embodiment illustrated in FIG. 6, which is only an illustrative example of one embodiment of the present disclosure. In other embodiments, the resonant-type DC/DC power converting unit 110 can also use an LLC symmetrical half-bridge circuit or LLC asymmetrical half-bridge circuit. In addition, the secondary circuit may also comprise a full-bridge uncontrolled rectifier, full-wave uncontrolled rectifier or full-wave synchronizing rectifier, depending on actual needs.

Figure 7:
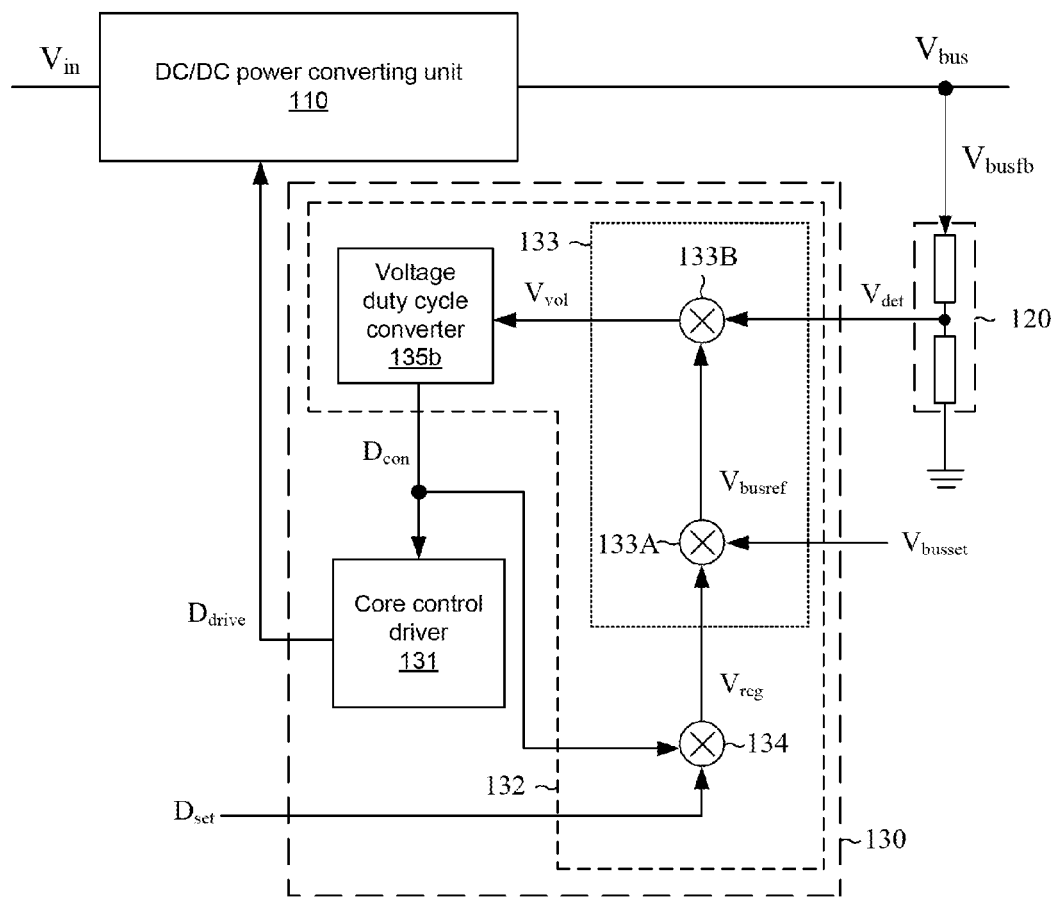
FIG. 7 is a schematic diagram of a DC/DC converter according to yet another embodiment of the present disclosure.

FIG. 7 is a schematic diagram of a DC/DC converter 100d according to yet another embodiment of the present disclosure. The DC/DC converter 100d in FIG. 7 is a variation for implementing the DC/DC converter 100a in FIG. 3. In FIG. 7, the DC/DC converter 100d is a PWM-type DC/DC device, and hence, the DC/DC converter 100d adopts a strategy involving controlling the duty cycle. In FIG. 7, the output detecting circuit 120 in FIG. 3 is implemented by a bleeder circuit; the control-signal processor 134, the default DC adjuster 133A and the voltage adjuster 133B of FIG. 3 can be implemented by software compiled in a computer or Micro-processor; and the voltage signal converter 135 of FIG. 3 is implemented by the voltage duty cycle converter 135b.

It should be noted that some of the operation means of the DC/DC converter 100d in FIG. 7 is similar to that of the DC/DC converter 100b in FIG. 4, and hence, only the different parts are described hereinbelow for the sake of brevity. In operation, the control-signal processor 134 compares the default duty cycle $D_{set}$ and the duty cycle $D_{con}$ so as to generate an amount of adjustment $V_{reg}$ about the default output voltage. The default duty cycle $D_{set}$ can be set in advance within a range, for example, the duty cycle range $D_{smin}$~$D_{smax}$ of FIG. 2B. Further, the voltage duty cycle converter 135b receives the voltage $V_{vol}$ and converts it into a duty cycle $D_{con}$. Thereafter, the core control driver 131 is configured to receive the duty cycle $D_{con}$ and drive the switch in DC/DC power converting unit 110 based on the duty cycle $D_{con}$. However, the present disclosure is not limited to this embodiment, which is only an illustrative example of the implementations of the present disclosure for facilitating the understanding of the present disclosure.

Figure 8:
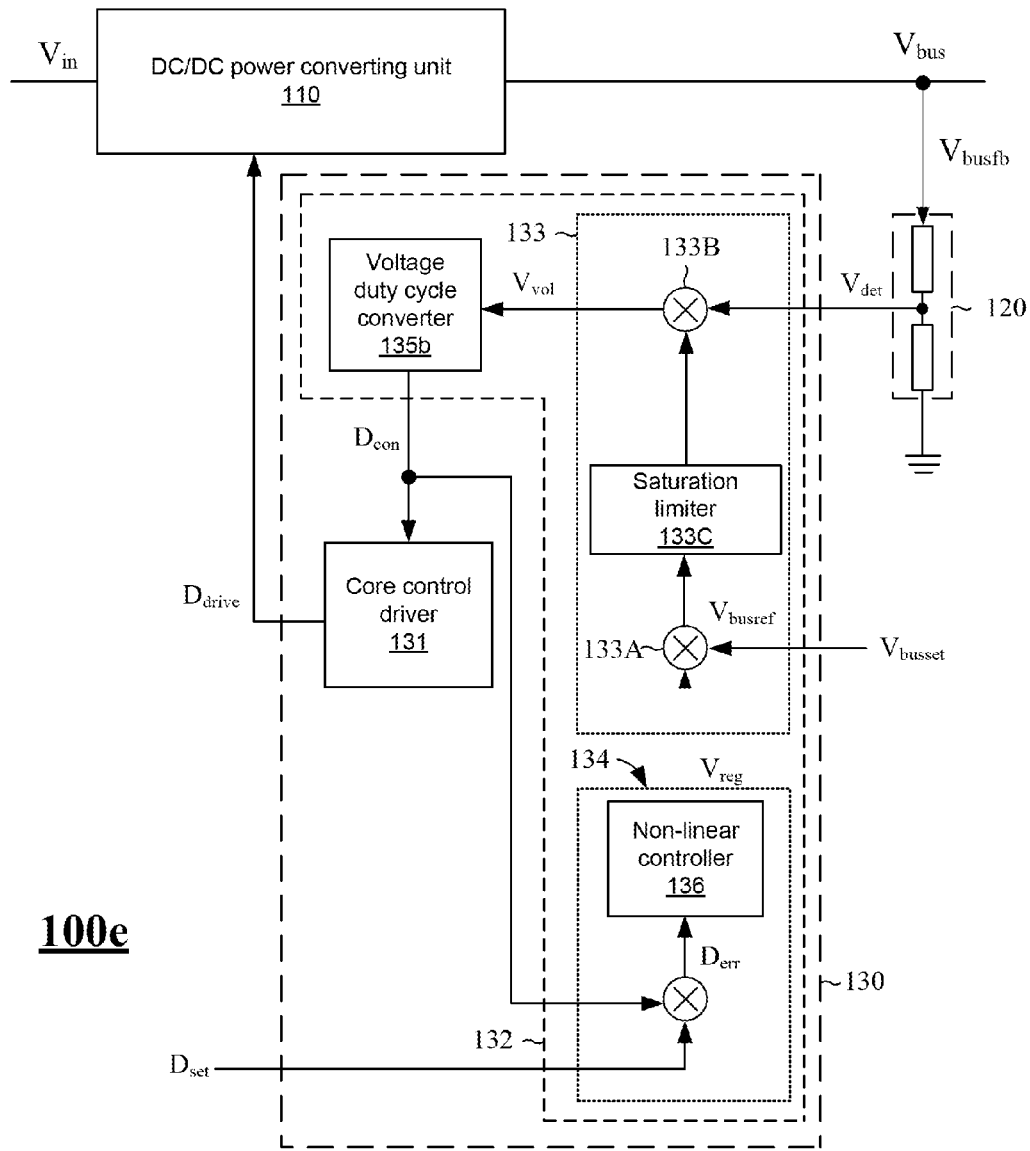
FIG. 8 is a schematic diagram of a DC/DC converter according to still another embodiment of the present disclosure.

FIG. 8 is a schematic diagram of a DC/DC converter 100e according to yet another embodiment of the present disclosure. Compared with FIG. 7, the control-signal processor 134 in FIG. 8 further comprises a non-linear controller 136 and the DC/DC converter 100e further comprises a saturation limiter 133C. In the operation, firstly the control-signal processor 134 is configured to compare the default duty cycle $D_{set}$ and the duty cycle $D_{con}$ to generate a duty cycle difference $D_{err}$. The above-mentioned non-linear controller 136 can process the duty cycle difference $D_{err}$ to generate the amount of adjustment $V_{reg}$ about default output voltage.

Figure 9:
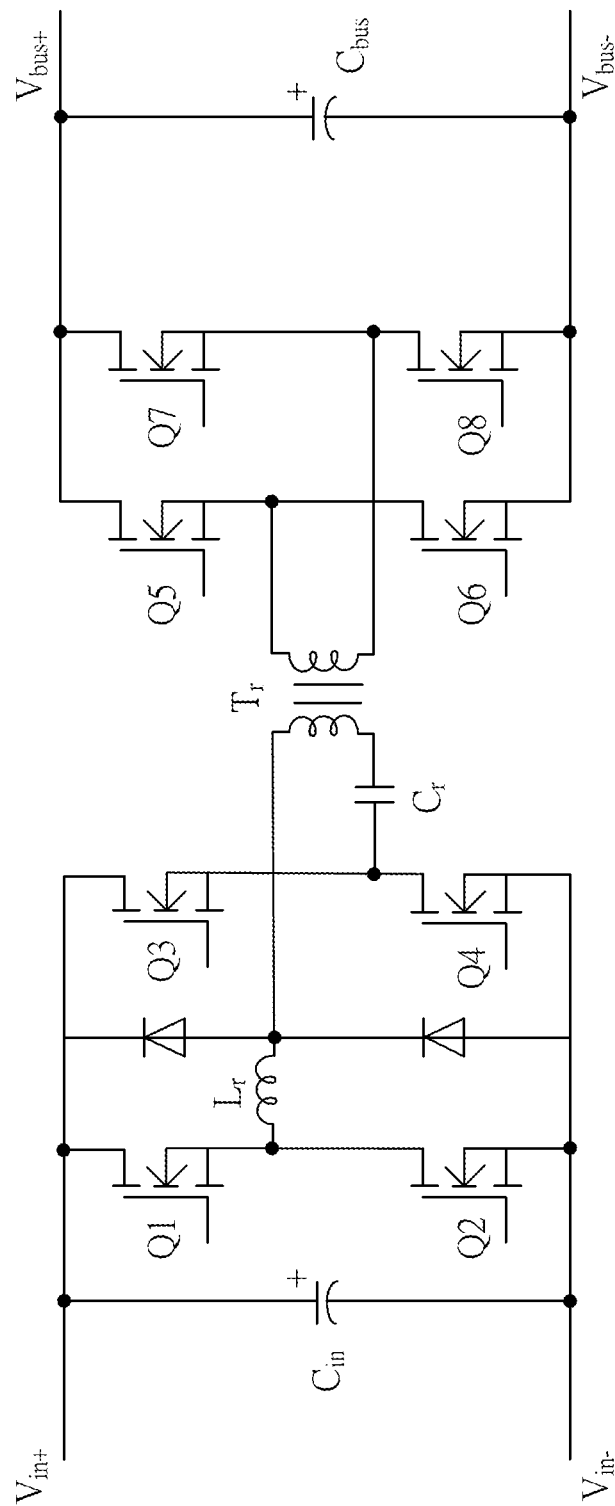
FIG. 9 is a schematic diagram of a PWM type DC/DC converter according to an embodiment of the present disclosure.

FIG. 9 is a schematic diagram of a PWM type DC/DC power converting unit 110 according to an embodiment of the present disclosure. As shown in FIG. 9, the PWM DC/DC power converting unit 110 is a phase-shift full-bridge circuit, the secondary circuit is a full-bridge synchronizing rectifier suitable for use in controlling the duty cycle, the input voltage is represented by $V_{in+}$ and $V_{in-}$, the input filter capacitor is represented by the primary switch element is represented by Q1~Q4, the resonant inductor is represented by $L_r$, the transformer is represented by $T_r$, the filter capacitor is represented by $C_r$, the secondary switch element is represented by Q5~Q8, the bus output filter capacitor is represented by $C_{bus}$, and the bus voltage is represented by $V_{bus+}$ and $V_{bus-}$. However, the present disclosure is not limited to the embodiment illustrated in FIG. 9, which is only an illustrative example of one embodiment of the present disclosure. In other embodiments, the PWM-type DC/DC power converting unit 110 can also use a buck circuit. In addition, the secondary circuit may also comprise a full-bridge uncontrolled rectifier, full-wave uncontrolled rectifier or full-wave synchronizing rectifier, depending on actual needs.

Figure 10:
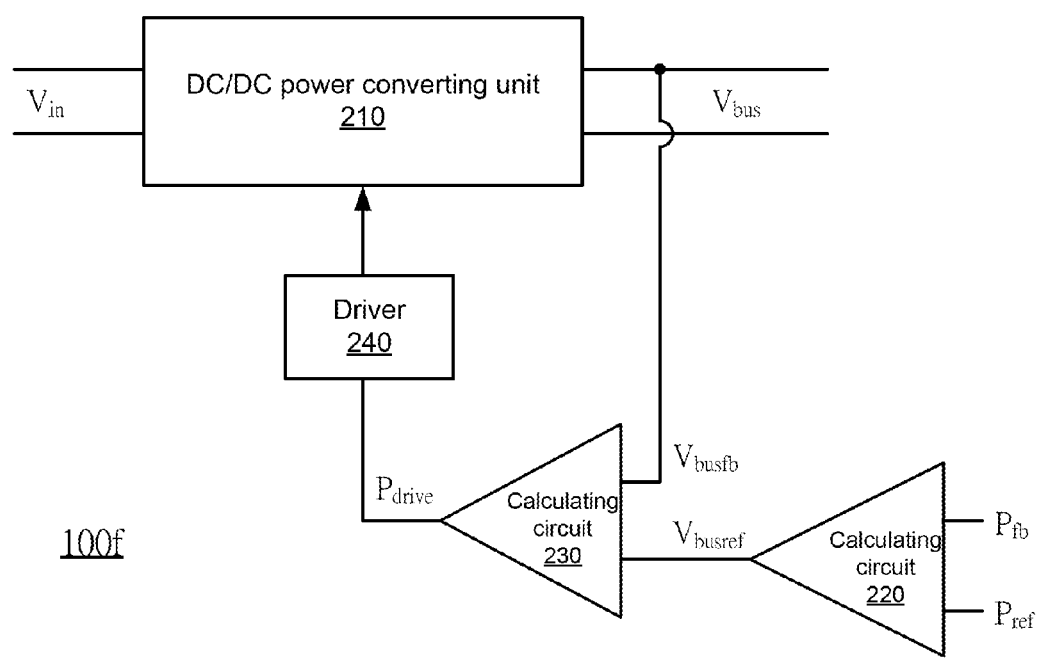
FIG. 10 is a schematic diagram of a DC/DC converter according to yet another embodiment of the present disclosure.

FIG. 10 is a schematic diagram of a DC/DC converter 100f according to yet another embodiment of the present disclosure. As shown in FIG. 10, the DC/DC converter 100f comprises a DC/DC power converting unit 210, a calculating circuit 220, a calculating circuit 230 and a driver 240. The DC/DC converter 100f is configured to convert the input voltage $V_{in}$ into an output voltage $V_{bus}$. The calculating circuit 220 is configured to generate a reference voltage $V_{busref}$ based on the feedback parameter $P_{fb}$ of the DC/DC power converting unit 210 and the default parameter $P_{ref}$. The calculating circuit 230 is configured to generate a driving parameter $P_{drive}$ based on the reference voltage $V_{busref}$ and the feedback voltage $V_{busfb}$ of the DC/DC power converting unit 210, while the driver 240 is configured to receive the driving parameter $P_{drive}$ and to drive the switch in the DC/DC power converting unit 210 based on the driving parameter $P_{drive}$.

Since the above-mentioned feedback-controlled process uses the feedback parameter $P_{fb}$ and the feedback voltage $V_{busfb}$, the output voltage $V_{bus}$ will vary depending on the input voltage $V_{in}$ or the output power. Such a control process is advantageous to keep the variation of the feedback parameter $P_{fb}$ (for example, the switch frequency or the duty cycle) of the DC/DC power converting unit 210 in a small range, so that the DC/DC power converting unit 210 can operate with higher efficiency.

Further, the DC/DC power converting unit 210 can be a resonant circuit. In this case, the above-mentioned feedback parameter $P_{fb}$ may adopt the switch frequency $F_{fb}$ of the DC/DC power converting unit 210, so that the control process of the resonant-type DC/DC power converting unit 210 could be optimized. In some embodiments, the DC/DC converter 210 can be a PWM-type DC/DC converting device. In this case, the above-mentioned feedback parameter $P_{fb}$ may adopt the duty cycle $D_{fb}$ of the DC/DC power converting unit 210, so that the control process of the PWM-type DC/DC device could be optimized.

In view of the above embodiments of the present disclosure, it is apparent that the application of the present invention has a number of advantages. Embodiments according to the present disclosure provide a DC/DC converter and a method for controlling the same. Said DC/DC converter and method for controlling the same can correspondingly control the switch frequency or duty cycle of the DC/DC converter within a small range to result step-like waveform of the output voltage according to normal range of the input voltage, thereby providing a DC/DC converter with higher efficiency.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for controlling a direct current to direct current (DC/DC) converter, comprising:
    correspondingly controlling and maintaining an output voltage of the DC/DC converter to stabilize at a first value according to a first range of an input voltage of the DC/DC converter during a first interval of the input voltage;
    correspondingly controlling and keeping the output voltage to stabilize at a second value according to a second range of the input voltage during a second interval of the input voltage, wherein the first interval of the input voltage is directly followed by the second interval of the input voltage;
    controlling the second value of the output voltage to be greater than the first value; and
    controlling and keeping a switch frequency or a duty cycle of the DC/DC converter within a first predetermined range during the first interval and the second interval,
    wherein if the switch frequency is a maximum value of the first predetermined range, when a value of the output voltage is still greater than the first value, adjusting the output voltage to the second value to maintain the switch frequency in the first predetermined range.

2. The method for controlling a DC/DC converter according to claim 1, wherein a normal range of the input voltage comprises the first interval and the second interval of the input voltage.

3. The method for controlling a DC/DC converter according to claim 2, wherein the output voltage of the DC/DC converter is controlled to be a step-like variation corresponding to the normal range of the input voltage.

4. The method for controlling a DC/DC converter according to claim 2, wherein the normal range of the input voltage further comprises a minimum-value interval and a maximum-value interval, wherein the minimum-value interval comprises a minimum value of the input voltage, and the maximum-value interval comprises a maximum value of the input voltage.

5. The method for controlling a DC/DC converter according to claim 4, wherein during the minimum-value interval or the maximum-value interval, the variation of the switch frequency or duty cycle of the DC/DC converter is controlled to be within a second predetermined range.

6. The method for controlling a DC/DC converter according to claim 5, wherein,
    the second predetermined range comprises the first predetermined range;
    in the minimum-value interval, the switch frequency of the DC/DC converter is varied in the second predetermined range having a minimum value lower than the minimum value of the first predetermined range; or
    in the maximum-value interval, the switch frequency of the DC/DC converter is varied in the second predetermined range having a maximum value greater than the maximum value of the first predetermined range.

7. The method for controlling a DC/DC converter according to claim 5, wherein,
    the second predetermined range comprises the first predetermined range;
    in the minimum-value interval, the duty cycle of the DC/DC converter is varied in the second predetermined range having a maximum value greater than the maximum value of the first predetermined range; or
    in the maximum-value interval, the switch frequency of the DC/DC converter is varied in the second predetermined range having the minimum value lower than the minimum value of the first predetermined range.

8. The method for controlling a DC/DC converter according to claim 1, wherein,
    a difference of the first interval of the input voltage equals to a difference of the second interval of the input voltage; and
    a variation range of the switch frequency in the first interval equals to the variation range of the switch frequency in the second interval.

9. The method for controlling a DC/DC converter according to claim 1, wherein the step of controlling and keeping the switch frequency or the duty cycle of the DC/DC converter within the first predetermined range comprises:
    in the first interval and the second interval of the input voltage, controlling the switch frequency to increase as the input voltage increases, or controlling the duty cycle to decrease as the input voltage increases.

10. The method for controlling a DC/DC converter according to claim 1, further comprising:
    if the switch frequency is the minimum value of the first predetermined range, when the value of the output voltage is still lower than second value, adjusting the output voltage to the first value to maintain the switch frequency in the first predetermined range.

11. The method for controlling a DC/DC converter according to claim 1, further comprising:
    if the duty cycle is the minimum value of the first predetermined range, when the value of the output voltage is still greater than the first value, adjusting the output voltage to the second value to maintain the duty cycle in the first predetermined range.

12. The method for controlling a DC/DC converter according to claim 1, further comprising:
    if duty cycle is the maximum value of the first predetermined range, when the value of the output voltage is still lower than the second value, adjusting the output voltage to the first value to maintain the duty cycle in the first predetermined range.

13. A DC/DC converter, comprising:
    a DC/DC power converting unit, comprising at least one switch component, wherein the DC/DC power converting unit is configured to receive an input voltage and output a corresponding output voltage;
    an output detecting circuit configured to detect the output voltage to output a DC detection signal; and
    a control drive unit, comprising:
        a core control driver configured to output a driving signal to the switch component; and a voltage-control signal converter configured to receive the DC detection signal and a default output voltage signal so as to output a control signal to the core control driver, wherein the control signal currently outputted by the voltage-control signal converter is fed back to the voltage-control signal converter, the voltage-control signal converter is configured with a predetermined range of the control signal that allows a variation of the control signal, and the voltage-control signal converter adjusts the default output voltage signal based on a current DC detection signal to make the control signal be within the predetermined range of the control signal.

14. The DC/DC converter according to claim 13, wherein the voltage-control signal converter comprises:
a control-signal processor, wherein the control-signal processor is configured with the predetermined range of the control signal and configured to receive a control signal, and compare the control signal and the predetermined range of the control signal so as to output an amount of adjustment the default output voltage signal;
an output voltage adjusting module configured to receive the amount of adjustment the default output voltage signal, the default output voltage signal and the DC detection signal to output a voltage control signal; and
a voltage signal converter configured to receive the voltage control signal and output the control signal.

15. The DC/DC converter according to claim 14, wherein the output voltage adjusting module comprises:
a default DC adjuster configured to receive a default output voltage signal and the amount of adjustment the default output voltage signal to output a reference output voltage signal and update the current default output voltage signal with a current reference output voltage signal; and
a voltage adjuster configured to receive the reference output voltage signal and the DC detection signal to output the voltage control signal.

16. The DC/DC converter according to claim 15, wherein the output voltage adjusting module further comprises:
a saturation limiter, wherein the saturation limiter is disposed between the default DC adjuster and the voltage adjuster, and is configured to confine the reference output voltage signal within a pre-set range.

17. The DC/DC converter according to claim 14, wherein the control-signal processor further comprises:
a non-linear controller deployed to calculate the amount of adjustment the default output voltage signal.

18. The DC/DC converter according to claim 13, wherein the DC/DC converter is a resonant DC/DC device, and the control signal outputted by the voltage-control signal converter is a frequency signal.

19. The DC/DC converter according to claim 13, wherein the DC/DC converter is a pulse-width-modulation (PWM) DC/DC device, and the control signal outputted by the voltage-control signal converter is a duty cycle signal.

* * * * *